Sept. 15, 1964  J. D. SOMERS  3,148,898
THERMALLY INSULATED FLEXIBLE HOSE ASSEMBLY
Filed Dec. 20, 1960
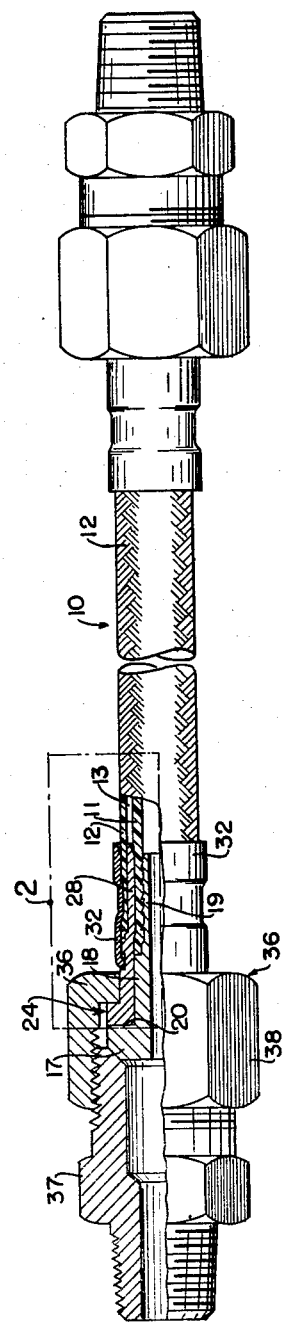
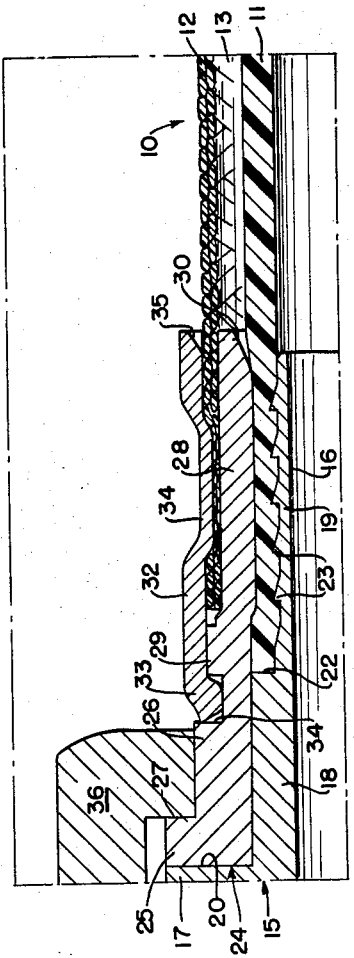
*INVENTOR.*
JOHN D. SOMERS
BY
Pennie, Edmonds, Morton, Barrows & Taylor
ATTORNEYS 3,148,898
THERMALLY INSULATED FLEXIBLE
HOSE ASSEMBLY
John D. Somers, Middlebury, Conn., assignor to Anaconda American Brass Company, a corporation of Connecticut
Filed Dec. 20, 1960, Ser. No. 77,201
1 Claim. (Cl. 285—149)

This invention relates to thermally insulated hose assemblies and, more particularly, to a hose assembly having an inner tube of polytetrafluoroethylene and a loose outer jacket of polyethylene terephthalate fibers. The invention further provides a hose assembly of the type described wherein a thermal insulating air pocket is maintained between the inner tube and outer jacket by a fitting of a novel design.

Hose assemblies are often used for the transfer of gases and liquids at elevated temperatures and for safety reasons it is often necessary to insulate their outer surfaces so that they will not cause burns to persons using them. Moreover, such hoses are often used for transferring liquids to a body which is capable of great freedom of movement, in which case they are subjected to bending, twisting and stretching forces. Therefore, the major characteristics of a hose of this type are that it is adequately insulated, strong and flexible, and impervious to fluids under operating conditions.

Each of the fittings associated with hoses of this type operate, of course, under the same conditions as the hose itself. Thus, when the hose assembly is subjected to extremes of pressure and temperature as well as the forces mentioned above, the fittings must also function effectively without bursting, leaking, loosening or blowing off the end of the hose. It is a further purpose of this invention, therefore, to provide a hose assembly of the type described above with a fitting of novel design which assists in the thermally insulated characteristics of the hose without hindering its flexibility.

The new hose assembly is particularly designed for increased flexibility as well as for providing effective thermal insulation. It includes an unreinforced inner tube composed solely of polytetrafluoroethylene as an outer tightly woven jacket of polyethylene terephthalate fibers loosely surrounding and spaced from said tube. Polytetrafluoroethylene is inert to most chemical attack and thus many fluids may be safely transported through such a hose. Also, its flexibility is adequate to meet the severe requirements contemplated for a hose of the type of this invention. The outer covering of polyethylene terephthalate fibers provides a jacket which not only is a good thermal insulator but also is one which possesses properties that enable it to complement the flexibility of the inner member.

Other resinous plastics which have proven particularly satisfactory as the inner tube in the hose assembly are fluorinated ethylene propylene and polymerized chlorotrifluoroethylene. Both these resinous plastics have high thermal insulating properties, excellent flexibility, and chemical inertness of the degree required of an inner tube in the new hose assembly.

The flexible hose assembly of the present invention comprises an inner tube of polytetrafluoroethylene through which a fluid is adapted to be conveyed, an outer jacket of polyethylene terephthalate fibers loosely surrounding said tube, a fitting fastened to at least one end of said hose for connecting the assembly to an outside body, and means on said fitting for holding said tubing and said jacket in spaced relationship at least adjacent said fitting whereby a thermal insulating air gap is provided therebetween.

A preferred embodiment of the hose assembly contemplated by this invention is described herein below with reference to the accompanying drawing, wherein:

FIG. 1 is a longitudinal elevation partly in section of the new hose assembly; and FIG. 2 is an enlarged fragmentary longitudinal section of the end fitting of this assembly.

In FIG. 1, a flexible hose 10, which has proven particularly desirable for the transfer of steam under pressure to commercial steam irons and the like, is shown constructed of an unreinforced seamless tubular inner member 11 of polytetrafluoroethylene and a tightly woven outer jacket 12 composed of polyethylene terephthalate fibers. The outer jacket 12 has a bore of larger diameter than the outside diameter of the inner tube 11, thereby permitting an insulating air gap 13 to be maintained between the inner tube 11 and the outer jacket 12 throughout the greater part of their length.

Referring to FIG. 2 an end fitting which includes a body member designated generally by the numeral 15 is shown. The body member 15 has an axial bore 16 extending completely therethrough and includes an end portion 17, a substantially cylindrical central portion 18 and a stem member 19. The central portion 18 of the body member 15 is of smaller diameter than the end portion 17 and together they define a shoulder 20 in a plane perpendicular to the axis of the fitting. The stem portion 19 extending axially from the central portion 18 of the body member 15 is of smaller diameter than the central portion 18 and defines a shoulder 22 with the central portion in a plane perpendicular to the axis of the fitting. Sharp-edged annular serrations 23 may be formed in the stem portion 19 to engage with the material of the inner tube 11 and thereby permit the stem portion to fit securely into the end of the inner tube 11. The end of the inner tube 11 then abuts the shoulder 22.

Abutting the shoulder 20 and extending axially therefrom for substantially the same length as the body member 15 is a ring member 24. The ring member 24 has a stepped cylindrical outer surface including an end portion 25 of greater diameter than an intermediate portion 26, whereby a shoulder 27 is formed in a plane perpendicular to the axis of the fitting, and an annular projecting portion 28 of smaller diameter than the portion 25, with a flange 29 formed thereon. The bore of the ring member 24 is slightly larger in diameter than the diameter of the central portion 18 of the body member 15, and fits closely around the central portion 18 with its end abutting the shoulder 20. The ring member 24 also has a flared end portion 30 which aids in the insertion of the inner tube 11, and prevents it from being bent too sharply or otherwise damaged.

The portion 28 of the ring member 24 is adapated to fit snugly between the inner tube 11 and the outer jacket 12. In this embodiment, the diameter of the bore is slightly less at the portion 28 and has been swaged down about the inner tube 11, thereby pressing it against the serrations 23 formed on the body member 15 and firmly holding the inner tube 11 in the fitting. The portion 28 also has a sufficiently thick cross-section to withstand subsequent crimping of other members about the outside diameter thereof and thereby prevent severe crushing or squeezing of the inner tube 11 between the portion 18 and the stem portion 19. Even though the portion 28 is tightly interlocked between the inner tube 11 and the outer jacket 12, the cross section is sufficiently thick to restrain each of these members from contacting each other and by so doing causes them to be held spaced from each other, at least adjacent the fitting. Hence, the air gap 13 is formed and maintained between the inner tube 11 and the outer jacket 12 in this region by the disposition of the ring member 24.

A sleeve 32 is crimped around the outer jacket and the portion 28 of the ring member 24. A beveled end portion 33 of the sleeve is disposed within an annular slot 39 defined by the portion 25 and the flange 29 of the ring member such that it prevents movement of the sleeve in a plane parallel to the axis of the fitting in a direction away from said fitting. A portion 34 of the sleeve 32 is substantially reduced in diameter by the crimping operation and thereby compresses the outer jacket 12 at this point to securely hold the outer jacket 12 in the fitting. The sleeve 32 has a flared end 35 which aids in the insertion of the outer jacket 12 and prevents the latter from being sharply bent or otherwise damaged.

A female fitting 36 abuts the shoulder 27 on the ring member 24 and is restrained from extensive longitudinal movement in a direction parallel to the axis of the fitting by the sleeve 32. As shown however, the female fitting 36 loosely surrounds the portion 26 of the ring member 24 whereby it is free to turn about the portion 26 which serves as its axis. As shown in FIG. 1, the female fitting 36 is adapted to be screwed onto a double male fitting 37 by means of the hexagonal portion 38 which is provided for receiving a wrench. Depending upon the particular requirements for the hose assembly, the threaded fitting 37 may be chosen from any suitable conventional design. The embodiment shown in the drawings is preferred however. This is due to the fact that upon screwing the female fitting 36 onto the male fitting 37 the shoulder 27, and therefore the ring member 24, is maintained securely against the end portion 17 of the body member 15 whereby a more leak-proof assembly is provided.

In operation, when the fluid used is steam for example, the steam tends to force its way between the stem portion 19 of the body member 15 and the inner tube 11, thereby pressing the inner tube tightly against the bore of the ring member.

Hose assemblies of this type possess relatively unimpaired flexibility and yet are durable enough to withstand severe bending, twisting and stretching forces and are substantially leak-proof as noted above. As shown in the drawings, the annular serrations 23 formed on the stem portion 19 of the body member 15 and the sleeve 32 which fits within the slot 34 prevent longitudinal displacement of the various elements along the axis of the fitting. Hence, the fitting assembly provides improved means which make separation of the inner tube 11 and the outer jacket 12 from the fitting highly unlikely. Moreover, the present invention contemplates an inner tube composed solely of polytetrafluoroethylene which possesses extremely flexible properties and being unreinforced enjoys uninhibited use of all its flexibility. Furthermore, the polyethylene terephthalate fiber jacket possesses high tensile strength, satisfactory recovery from strain due to its relatively high modulus of elasticity, and resistance to heat at temperatures of 400° F. and higher.

I claim:

A flexible hose assembly for the transfer of fluids comprising an inner tube through which the fluid is conveyed, said tube being of unreinforced polytetrafluoroethylene, an outer tightly woven jacket of polyethylene terephthalate fibers loosely surrounding said tube, and a fitting fastened to at least one end of said hose, said fitting comprising a body member having an axial bore extending completely therethrough, said body member having a substantially cylindrical end portion and a stem portion adapted to fit into said inner tube, annular serrations formed about the outer surface of said stem portion to allow for snug fitting in the inner tube, a ring member adapted to fit tightly around said body member and said inner tube, said ring member having an annular projecting end portion adapted to fit within the end of said outer jacket and having sufficient cross-sectional thickness for maintaining said inner tube and said outer jacket spaced from each other at least adjacent said fitting to provide a thermal insulating air gap therebetween, and a substantially cylindrical sleeve member to be crimped around the terminal end of said outer jacket and a portion of said ring, said sleeve having a portion disposed within a groove formed on said ring member to prevent axial displacement of said sleeve, said sleeve and said projecting portion of said ring positioned co-extensively axially of said hose end a distance greater than said stem portion and each of said projecting portion and said sleeve having a chamfer formed in the outer end face thereof so as to relieve stresses on said inner tube and jacket on bending, and said thickness of said projecting portion being greater than the cross-sectional thickness of the stem portion and of the sleeve and sufficiently rigid to prevent distortion of the stem portion upon crimping of said sleeve.

References Cited in the file of this patent

UNITED STATES PATENTS

| | | |
|---|---|---|
| 656,187 | Gunnell | Aug. 21, 1900 |
| 2,230,115 | Kreidel | Jan. 28, 1941 |
| 2,453,997 | MacWilliam | Nov. 16, 1948 |
| 2,463,293 | Mentel | Mar. 1, 1949 |
| 2,512,433 | Leben | June 20, 1950 |
| 2,787,289 | Press | Apr. 2, 1957 |
| 2,838,073 | Mattia | June 10, 1958 |
| 2,858,147 | Guarnaschelli | Oct. 28, 1958 |
| 2,865,094 | Press | Dec. 23, 1958 |
| 2,969,812 | Ganahl | Jan. 31, 1961 |

FOREIGN PATENTS

| | | |
|---|---|---|
| 288,757 | Great Britain | Apr. 19, 1928 |
| 888,030 | Great Britain | Jan. 24, 1962 |

OTHER REFERENCES

Billmeyer, F. W.: Textbook of Polymer Chemistry, Interscience Publishers, 1957, pp. 345–346, copy avaialble in Mechanized Div. "A."